Oct. 17, 1933.　　　　E. W. COVEY　　　　1,930,585

TIRE

Filed March 20, 1929

Inventor
Earl W. Covey
By Thomas L. Wilder
Attorney

Patented Oct. 17, 1933

1,930,585

UNITED STATES PATENT OFFICE 1,930,585

TIRE

Earl W. Covey, Big Moose, N. Y.

Application March 20, 1929. Serial No. 348,591

9 Claims. (Cl. 152—13)

My invention relates to a tire, and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a tire either of the pneumatic or solid formation that will not skid or slide. Such a tire will be found especially serviceable when the automobile is traveling on slippery or wet pavements in the summer time or icy pavements or snow covered or drifted roads in the winter time. Furthermore, the tire will be found useful to aid the automobile in traveling over muddy roads and through quagmires occasionally found therein into which the wheels of an automobile as heretofore sink and revolve uselessly without being able to produce sufficient traction to cause a movement of the car.

Moreover, the device hereinafter referred to, accomplishes its result not only without injuring in any way either the tire or the pavement but also will have the effect of prolonging the life of the tire and increase the ease and smoothness of its riding qualities.

Figure 1:
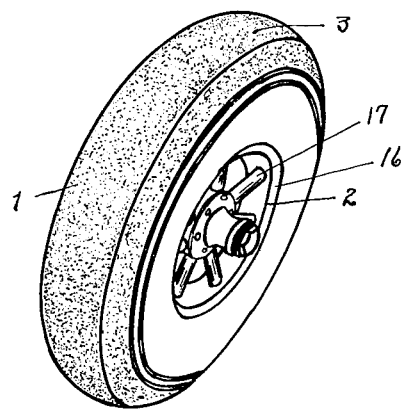
Fig. 1 is a perspective view of the improved automobile tire mounted on a wheel.
Figure 2:
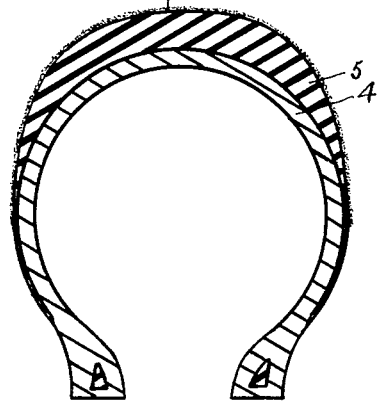
Fig. 2 is an enlarged detail view showing a transverse section of the tire.

Referring more particularly to the drawing, a tire of the ordinary balloon type is shown at 1 mounted upon a spoke wheel 2. The tread of the tire is indicated by 3. The balloon tire is made of the usual cord fabric 4 and an outer rubber casing 5. The tread 3 and a portion of the walls of the tire is moulded or made from what is well known in the art as crepe rubber which is a pure gum rubber formed by spraying the outer or exterior surface of the rubber with a pure rubber solution or latex to provide a rough serrated or granulated surface. The rubber solution, can be made of pure rubber and some harder foreign substance such as cork or any other material to provide a compound having the qualities of a gummy, spongy, substance to effect a soft, gummy, yielding surface to present to the road surface for traction thereon. The exterior surface of the rubber will have the appearance in the finished tire that is somewhat similar to sand paper. It will not have, however, the hardness of sand-paper but rather the soft, spongy and yielding qualities of rubber, whereby to make it serviceable in gripping the roadbed.

The entire surface of tread 3 and a portion of the side walls will be covered, therefore, with literally thousands of these little short rubber projections, elevations, granules or short hairs that will have a tendency to stick to snow or ice rather than slip thereon, as heretofore, especially with the hard rubber tread. Furthermore, the use of crepe rubber presenting a soft tread surface will have the added advantage of not wearing smooth as in the case with the ordinary rubber. Moreover, it will wear longer and aid in lending a cushion effect, whereby to increase the qualities of the tires.

Figure 3:
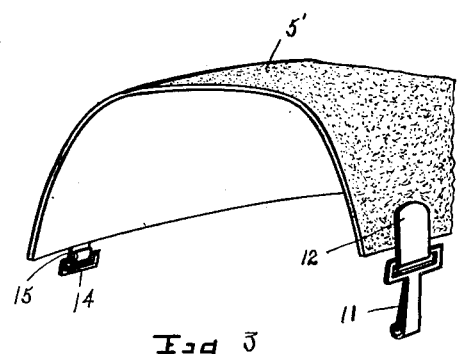
Fig. 3 is an enlarged detail view showing a modification.
Figure 5:
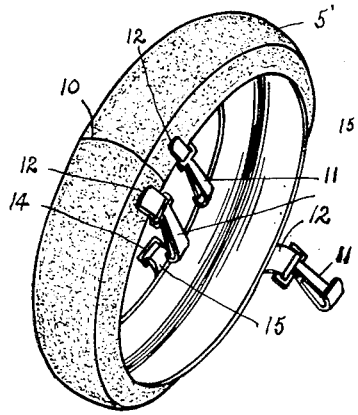
Fig. 5 is a perspective view of the removable cover.

Figs. 3 and 5 show a slight modification. Here a removable cover 5' is used for covering a tire. The cover has a tread made of the same crepe rubber or other like substance presenting a surface covered with thousands of little short granules or projections that aid in causing traction. Cover 5' is made to conform to the contour of the outer tread and adjacent parts of tire 1. The cover is split transversely at 10 to enable the same to be applied at will especially in the winter time when it is desired to travel over icy or snow drifted roads or in the summer time over wet pavements or muddy roads. It is held in position by snap fasteners 11 secured by tabs 12 to one side of cover 5' engaging eyelets 14 secured by tabs 15 to the other side of cover 5'. Snap fasteners 11 will be hooked beneath the felloe 16 and between the spokes 17 of the wheel. Although only three such fasteners are here shown, more may be used if found desirable.

Figure 4:
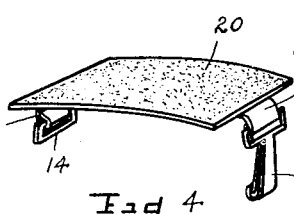
Fig. 4 is a perspective view of a further modified form.

A further modification is shown at Fig. 4 embodying a patch 20 having a like crepe rubber tread surface as explained heretofore in connection with the other structures and designed to be applied to any part of the tire by engaging the snap fastener 21 thereon beneath felloe 16 and between spokes 17 of the wheel. Such a patch will be found particularly useful when the wheel has sunk into a mudhole or mire and only the top of the wheel is available for such application.

Figure 6:
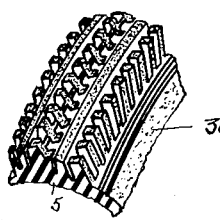
Fig. 6 is a fragmentary view of a corrugated tire showing the non-skid feature applied thereto.

The crepe or rough rubber, although shown on the surface without any designs or grooves therein, may be applied to the exterior surface of a tire 30 having a corrugated design such as shown in Fig. 6.

Having thus described my invention what I claim as new and desire to secure by Letters Patent is as follows:

1. In a tire, having a casing, crepe rubber formed integral therewith to prevent skidding.

2. In a tire, comprising a fabric with a rubber casing, crepe rubber applied to said casing to prevent skidding.

3. In a tire composed of fabric with the rubber outer surface, a crepe rubber composition applied to said surface to prevent skidding.

4. In a tire of the balloon type a cord fabric portion, a rubber portion overlaying said cord fabric portion and crepe rubber overlaying said first named rubber portion, whereby to prevent skidding.

5. In a tire, a cord fabric portion, a rubber portion overlaying said fabric portion and crepe rubber covering the tread of said rubber portion whereby to prevent skidding.

6. In a tire, a cord fabric portion, a rubber portion overlaying said fabric portion, and a crepe rubber portion covering the tread and sides of said tire, whereby to prevent skidding.

7. In a tire, a cord fabric portion and a crepe rubber having a roughened exterior surface for covering said fabric portion.

8. In a tire composed of fabric, a crepe rubber composition applied to said fabric to prevent skidding.

9. In a tire having a cord fabric portion, a crepe rubber applied to said fabric cord fabric, whereby to prevent skidding.

EARL W. COVEY.